United States Patent [19]

Minato

[11] Patent Number: 5,594,289
[45] Date of Patent: Jan. 14, 1997

[54] MAGNETIC ROTATING APPARATUS

[76] Inventor: Kohei Minato, No. 901, 28-20, 4-Chome, Yotsuya, Shinjuku-Ku, Tokyo, Japan

[21] Appl. No.: 574,582

[22] Filed: Dec. 14, 1995

Related U.S. Application Data

[63] Continuation of Ser. No. 305,563, Sep. 14, 1994, abandoned.

[30]  Foreign Application Priority Data

Sep. 16, 1993  [JP]  Japan ..................................... 5-230162

[51] Int. Cl.⁶ .................................................. H02K 16/00
[52] U.S. Cl. ........................................ 310/152; 310/156
[58] Field of Search .................................. 310/152, 154, 310/156; 335/272

[56]  References Cited

U.S. PATENT DOCUMENTS

| 4,629,921 | 12/1986 | Gavaletz | 310/156 |
| 4,751,486 | 6/1988 | Minato | 35/272 |
| 5,313,159 | 5/1994 | Allwine | 324/207.2 |

FOREIGN PATENT DOCUMENTS

| 551533A1 | 7/1993 | European Pat. Off. | 310/152 |
| 0515533 | 7/1993 | European Pat. Off. | 310/152 |
| 2568067A | 1/1986 | France | 310/152 |
| 2568067 | 1/1986 | France | 310/152 |
| 0277365 | 12/1986 | Japan | 310/152 |
| 61277365 | 12/1986 | Japan | 310/152 |
| 1-69275 | 3/1989 | Japan | 310/152 |
| 0069275 | 3/1989 | Japan | 310/152 |
| 0170361 | 7/1989 | Japan | 310/152 |
| 1-170361 | 7/1989 | Japan | 311/152 |
| 8805976 | 8/1988 | WIPO | 310/156 |

*Primary Examiner*—Thomas M. Dougherty
*Attorney, Agent, or Firm*—Marks & Murase L.L.P.

[57]  ABSTRACT

On a rotor which is fixed to a rotatable rotating shaft, a plurality of permanent magnets are disposed along the direction of rotation such that the same magnetic pole type thereof face outward. In the same way, balancers are disposed on the rotor for balancing the rotation of this rotor. Each of the permanent magnets is obliquely arranged with respect to the radial direction line of the rotor. At the outer periphery of the rotor, an electromagnet is disposed facing this rotor, with this electromagnet intermittently energized based on the rotation of the rotor. According to the magnetic rotating apparatus of the present invention, rotational energy can be efficiently obtained from permanent magnets. This is made possible by minimizing as much as possible current supplied to the electromagnets, so that only a required amount of electrical energy is supplied to the electromagnets.

12 Claims, 3 Drawing Sheets

MAGNETIC ROTATING APPARATUS

This application is a continuation of application Ser. No. 08/305,563 filed Sep. 14, 1994 now abandoned.

BACKGROUND OF THE INVENTION

1. Field of the Invention

The present invention relates to a magnetic rotating apparatus, and more particularly, to a magnetic rotating apparatus which utilizes repulsive forces produced between a permanent magnet and an electromagnet.

2. Description of the Prior Art

In a conventional electric motor, an armature as a rotor consists of turns of wires, and electric field as a stator consists of a permanent magnet. In such the conventional electric motor, however, current must be usually supplied to windings of the armature which is rotated. When the current is supplied, heat is generated, which gives rise to the problem that not much driving force is efficiently generated. This, in turn, gives wise to the problem that the magnetic forces cannot be efficiently obtained from the permanent magnet.

In addition, in the conventional electric motor, since the armature is so constructed as consisting of the windings, the moment of inertia cannot be made very high, so that enough torque cannot be obtained.

To overcome the above-described problems of such the conventional electric motor, the inventor proposed, in Japanese Patent Publication No. 61868/1993 (U.S. Pat. No. 4,751,486) a magnetic rotating apparatus in which a plurality of the permanent magnets are disposed along the two rotors, respectively, at a predetermined angle, and in which an electromagnet is disposed at one of the rotors.

In a generally constructed conventional electric motor, there is a limit as to how much the efficiency of energy conversion can be increased. In addition, the torque of the electric motor cannot be made high enough. For the above reasons, hitherto, various improvements have been made on existing electric motors, without any success in producing an electric motor so constructed has providing satisfactory characteristics.

In the magnetic rotating apparatus disclosed in Japanese Patent Publication No. 6868/1993 (U.S. Pat. No. 4,751,486) a pair of rotors is rotated. Therefore, it is necessary for each of the rotors to have high precision, and in addition, measures must be taken for easier rotation control.

SUMMARY OF THE INVENTION

In view of the above-described problems, the object of the present invention is to provide a magnetic rotating apparatus in which rotational energy can be efficiently obtained from the permanent magnet with a minimum amount of electrical energy, and in which rotation control can be carried out relatively easily.

According to one aspect of the present invention, there is provided a magnetic rotating apparatus comprising a rotating shaft; a rotor which is fixed to the rotating shaft and which has disposed thereon permanent magnet means and means for balancing rotation, the permanent magnet means being disposed such that a plurality of magnetic poles of one (or first) polarity type is arranged along an outer peripheral surface in the direction of rotation, and a plurality of magnetic poles of the other (or second) polarity type arranged along an inner peripheral surface, with each pair of corresponding magnetic poles of one and the other polarities obliquely arranged with respect to a radial line; electromagnet means, which is disposed facing this rotor, for developing a magnetic field which faces the magnetic field of the permanent magnet means of the rotor and detecting means for detecting rotating position of the rotor to allow the electromagnet means to be energized.

According to another aspect of the present invention, there is provided a magnetic rotating apparatus comprising a rotating shaft a rotor which is fixed to the rotating shaft and which has disposed thereon a plurality of permanent magnets and balancers for balancing rotation, the permanent magnets being disposed such that one magnetic polarity type is arranged along an outer peripheral surface in the direction of rotation and the other magnetic polarity type arranged along an inner peripheral surface, with each pair of corresponding magnetic poles of one and the other polarities obliquely arranged with respect to a radial line; an electromagnet, which is disposed facing this rotor, for developing a magnetic field which produces the other magnetic polarity type on the facing surface; and energizing means for intermittently energizing the electromagnet means from where the leading permanent magnet, based on the rotation of the rotor, passes the facing surface of the electromagnet in the direction of rotation.

According to still another aspect of the present invention, there is provided magnetic rotating apparatus comprising a rotating shaft; a first rotor which is fixed to the rotating shaft and which has disposed thereon permanent magnet means and means for balancing rotation, the permanent magnet means being disposed such that a plurality of magnetic poles of the second polarity type is arranged along an outer peripheral surface in the direction of rotation, and a plurality of magnetic poles of the first pole type arranged along an inner peripheral surface, with each pair of corresponding magnetic poles of one and the other polarities obliquely arranged with respect to a radial line; a second rotor which rotates along with the first rotor and is fixed to the rotating shaft, having disposed thereon a plurality of permanent magnets and balancers for balancing rotation, the permanent magnets being disposed such that one magnetic polarity type is arranged along an outer peripheral surface in the direction of rotation and the other magnetic polarity type arranged along an inner peripheral surface, with each pair of corresponding magnetic poles of one and the other polarities obliquely arranged with respect to a radial line a first and a second electromagnet means, which are magnetically connected and disposed facing the first and second rotors, respectively, for developing a magnetic field which faces the magnetic field of the permanent magnet means of the first and second rotors; and detecting means for detecting rotating position of the rotors to allow the electromagnet means to be energized.

The nature, principle and utility of the invention will become more apparent from the following detailed description when read in conjunction with the accompanying drawings.

DESCRIPTION OF THE PREFERRED EMBODIMENTS

The magnetic field developed by an electromagnet means and that of a permanent magnet means of a rotor repel each other. In addition, the magnetic field of the permanent magnet means is flattened by the magnetic fields of other nearby permanent magnets and electromagnet means. Therefore, a torque is produced therebetween to efficiently rotate the rotor. Since the rotor has a high inertial force, when the rotor starts rotating, its speed increases by the inertial force and the turning force.

A magnetic rotating apparatus related to one embodiment of the present invention will be described with reference to the following drawings.

Figure 1:
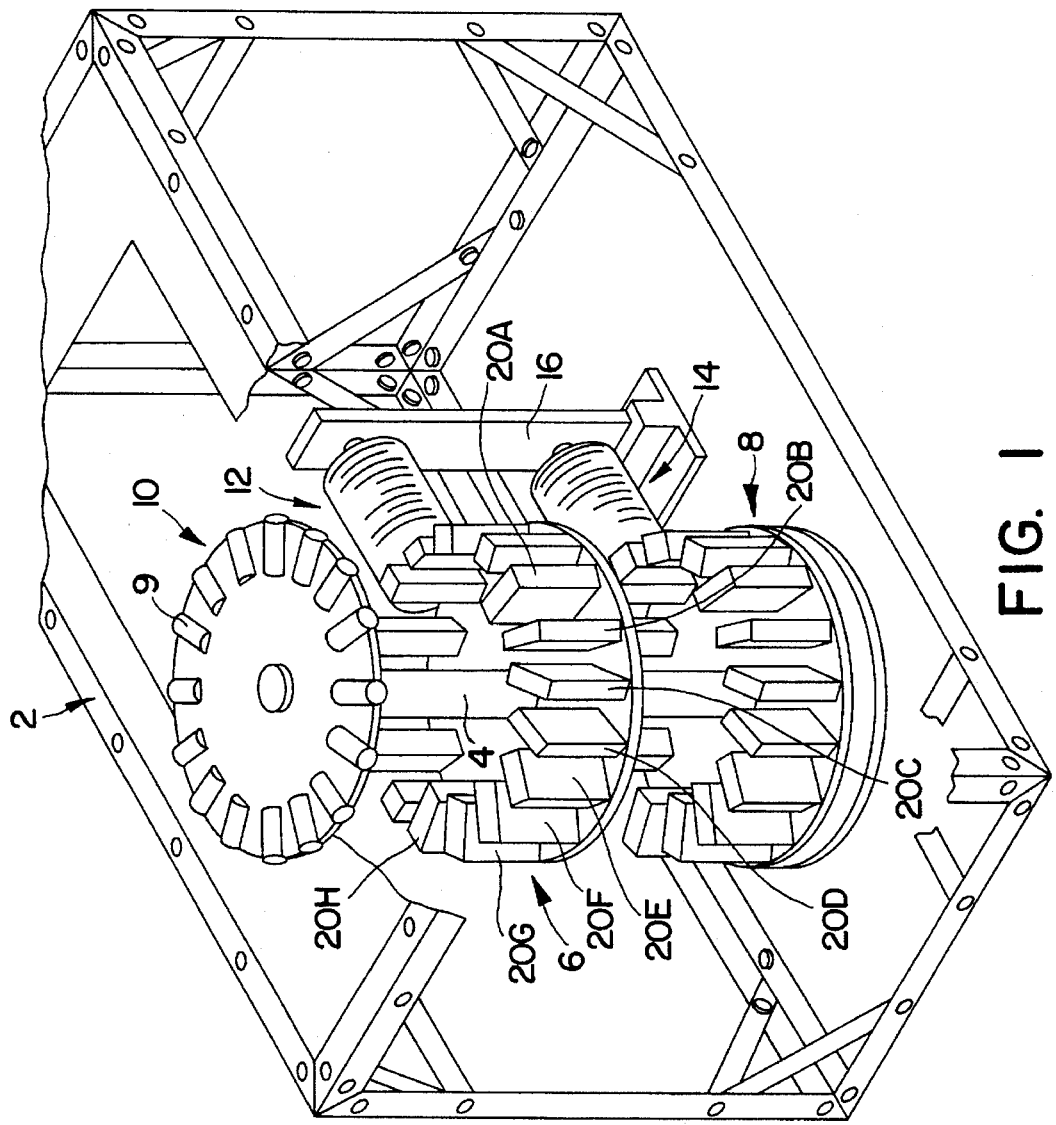
FIG. 1 is a perspective view schematically illustrating a magnetic rating apparatus according to one embodiment of the present invention
Figure 2:
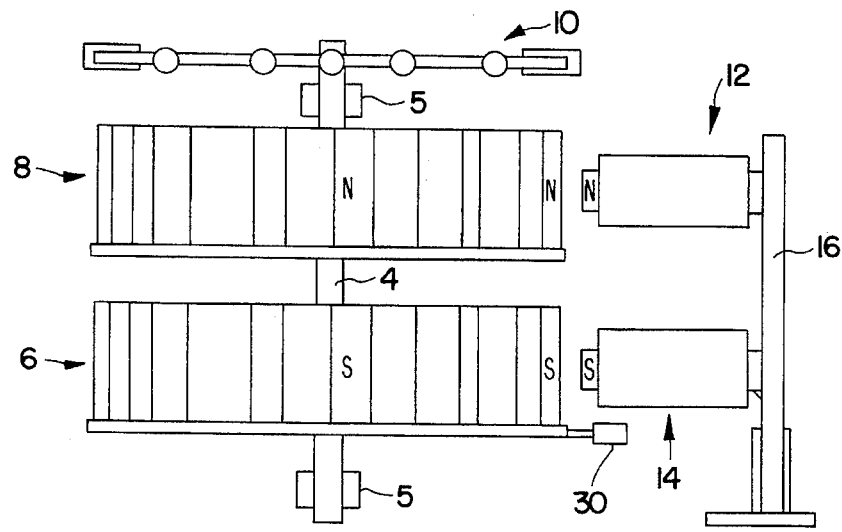
FIG. 2 is a side view of the magnetic rotating apparatus illustrated in FIG. 1.

FIGS. 1 and 2 are schematic diagrams of a magnetic rotating apparatus related to one embodiment of the present invention. In the specification, the term "magnetic rotating apparatus" will include an electric motor, and from its general meaning of obtaining turning force from the magnetic forces of permanent magnets, it will refer to a rotating apparatus utilizing the magnetic forces. As shown in FIG. 1, in the magnetic rotating apparatus related to one embodiment of the present invention, a rotating shaft 4 is rotatably fixed to a frame 2 with bearings 5. To the rotating shaft 4, there are fixed a first magnet rotor 6 and a second magnet rotor 8, both of which produce turning forces and a rotated body 10, which has mounted therealong a plurality of rod-shaped magnets 9 for obtaining the turning forces as energy. They are fixed in such a manner as to be rotatable with the rotating shaft 4. At the first and second magnet rotors 6 and 8, there are provided, as will be described later in detail with reference to FIGS. 1 and 2, a first electromagnet 12 and a second electromagnet 14 respectively are energized in synchronism with rotations of the first and second magnet rotors 6 and 8, both of which face each other and are each disposed in a magnetic gap. The first and second electromagnets 12 and 14 are respectively mounted to a yoke 16, which forms a magnetic path.

Figure 3:
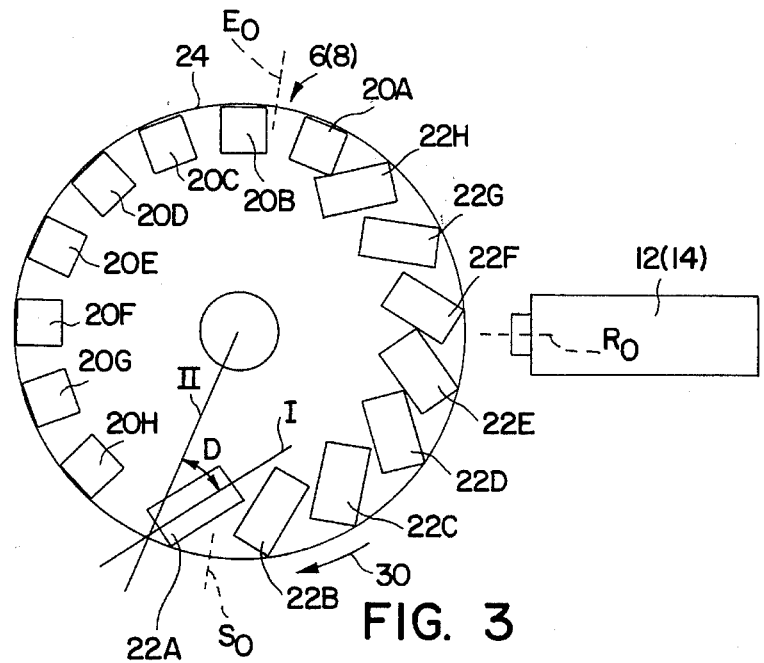
FIG. 3 is a plan view of a rotor of the magnetic rotating apparatus illustrated in FIGS. 1 and 2.

As shown in FIG. 3, the first and second magnet rotors 6 and 8 each have disposed on its disk-shaped surface a plurality of tabular magnets 22A through 22H for developing a magnetic field for generating the turning forces and balancers 20A through 20H, made of non-magnetic substances, for balancing the magnet rotors 6 and 8. In the embodiments, the first and second magnet rotors 6 and 8 each have disposed along the disk-shaped surface 24 at equal intervals the eight tabular magnets 22A through 22H along half of the outer peripheral area and +the eight balancers 20A through 20H along the other half of the outer peripheral area.

As shown in FIG. 3, each of the tabular magnets 22A through 22H are disposed so that its longitudinal axis 1 makes an angle D with respect to a radial axis line 11 of the disk-shaped surface 24. In the embodiment, an angle of 30 degrees and 56 degrees have been confirmed for the angle D. An appropriate angle, however, can be set depending on the radius of the disk-shaped surface 24 and the number of tabular magnets 22A through 22H to be disposed on the disk-shaped surface 24. As illustrated in FIG. 2, from the viewpoint of effective use of the magnetic field, it is preferable that the tabular magnets 22A through 22H on the first magnet rotor 6 are positioned so that their N-poles point outward, while the tabular magnets 22A through 22H on the second magnet rotor 8 are positioned so that their S-poles point outward.

Exterior to the first and second magnet rotors 6 and 8, the first and second electromagnets 12 and 14 are disposed facing the first and second magnet rotors 6 and 8 respectively in the magnetic gap. When the first and second electromagnets 12 and 14 are energized, they develop a magnetic field identical in polarity to the their respective tabular magnets 22A through 22H so that they repel one anther. In other words, as shown in FIG. 2, since the tabular magnets 22A through 22H on the first magnet rotor 6 have their N-poles facing outwards, the first electromagnet 12 is energized so that the side facing the first magnet rotor 6 develops an N-polarity. In a similar way, since the tabular magnets 22A through 22H on the second magnet rotor 8 have their S-poles facing outwards, the second electromagnet 14 is energized so that the side facing the tabular magnets 22A through 22H develops a S-polarity. The first and second electromagnets 12 and 14, which are magnetically connected by the yoke 16, are magnetized so that the sides facing their respective magnet rotors 6 and 8 are opposite in polarity with respect to each other. This means that the magnetic fields of the electromagnets 12 and 14 can be used efficiently.

A detector 30, such as microswitch, is provided to either one of the first magnet rotor 6 or second magnet rotor 8 to detect the rotating position of the magnet rotors 6 and 8. That is, as shown in FIG. 3, in a rotational direction 32 of the tabular magnets 22A through 22H, the first and the second magnet rotors 6 and 8 are respectively energized when the leading tabular 22A has passed. In other words, in the rotational direction 32, the electromagnet 12 or 14 is energized when starting point So, located between the leading tabular magnet 22A and the following tabular magnet 22B coincides with the center point Ro of either the electromagnet 12 or 14. In addition, as illustrated in FIG. 3, in the rotational direction 32 of the tabular magnets 22A through 22H, the first and the second magnet rotors 6 and 8 are de-energized when the last tabular magnet 22A has passed. In the embodiment, an end point Eo is set symmetrical to the starting point So on the rotating disk-shaped surface 24. When the end point Eo coincides with the center point Ro of either the electromagnet 12 or 14, the electromagnet 12 or 14 is de-energized, respectively. As will be described later, with the center point Ro of the electromagnet 12 or 14 arbitrarily set between the starting point So and the end point Eo, the magnet rotors 6 and 8 start to rotate when the electromagnets 12 and 14 and their tabular magnets 22A through 22H face one another. When a microswitch is used as the detector 30 for detecting the rotating position, the contact point of the microswitch is allowed to slide along the surface of the rotating disk-shaped surface 24. A step is provided for the starting point So and the end point Eo so that the contact of the microswitch closes between the starting point So and the end point Eo. The area along the periphery therebetween protrudes beyond the other peripheral areas of the rotating disk-shaped surface 24. It is apparent that a photo sensor or the like may be used instead of the microswitch as the detector 30 for detecting the rotating position.

Figure 4:
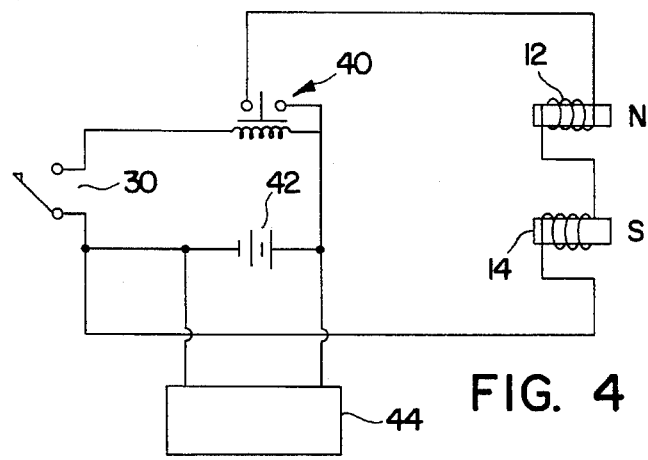
FIG. 4 is a circuit diagram illustrating a circuit in the magnetic rotating apparatus shown in FIG. 1.

As shown in FIG. 4, the windings of the electromagnets 12 and 14 are connected to a DC power source 42 through a movable contact of a relay 40, which is connected in series with the windings. A series circuit containing the relay 40 (solenoid) and the detector 30 or microswitch is connected to the DC power source 42. In addition, from the viewpoint of energy conservation, a charger 44 such as a solar cell is connected to the DC power source 42. It is preferable that the DC power source 42 is constantly chargeable using solar energy or the like.

Figure 5:
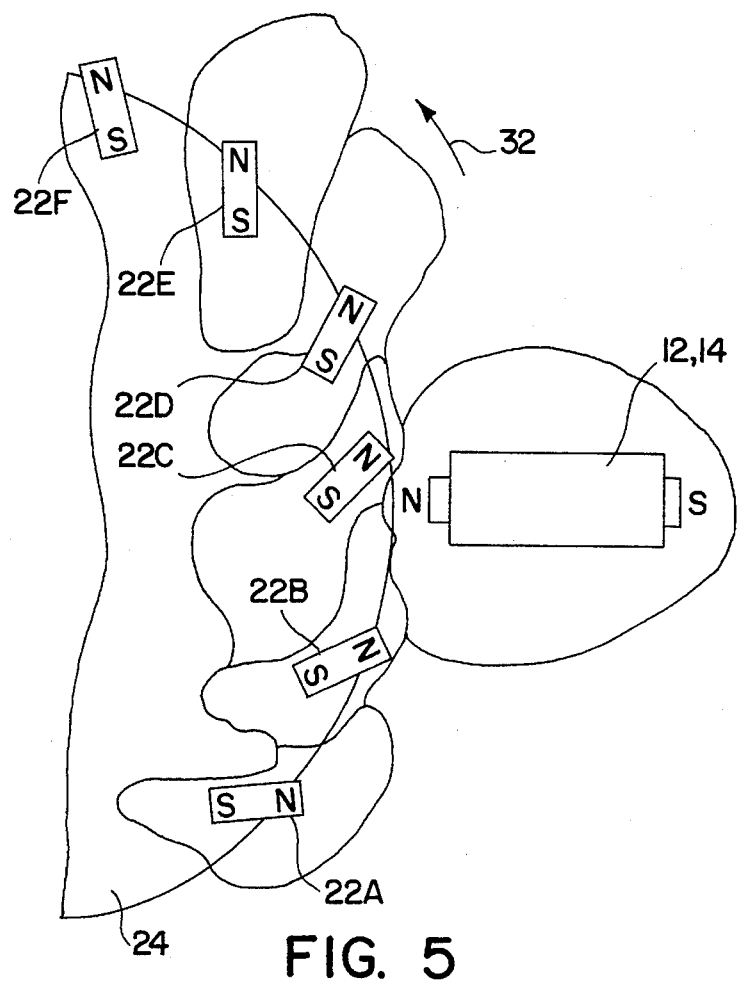
FIG. 5 is a plan view showing a magnetic field distribution formed between the rotor and the electromagnet of the magnetic rotating apparatus shown in FIGS. 1 and 2 and FIG. 6 is an explanatory view illustrating a torque which causes rotation of the rotor of the magnetic rotating apparatus shown in FIGS. 1 and 2.

In the magnetic rotating apparatus illustrated in FIGS. 1 and 2, a magnetic field distribution shown in FIG. 5 is formed between the tabular magnets 22A through 22H, disposed on each of the magnet rotors 6 and 8, and the electromagnets 12 and 14 which face them, respectively. When the electromagnet 12 or 14 is energized, a magnetic field of a tabular magnet of the tabular magnets 22A through 22H, adjacent to the electromagnet 12 or 14, is distorted in the longitudinal direction in correspondence with the rotational direction. This results in the generation of a repulsive force therebetween. As is apparent from the distortion of the magnetic field, the repulsive force has a larger component in the longitudinal or perpendicular direction, and produces a torque, as shown by an arrow 32. Similarly, a magnetic field of a tabular magnet of the tabular magnets 22A through 22H, which next enters the magnetic field of the electromagnet 12 or 14, is distorted. Since it moves toward an opposite pole of the preceding tabular magnet of the tabular magnets 22A through 22H, its magnetic field is distorted to a larger extent, and thereby flattened. This means that the repulsive force produced between the tabular magnets of the tabular magnets 22A through 22H, which have already entered the magnetic field of the electromagnets 12 or 14, is larger than the repulsive force developed between the next-entering tabular magnets of the tabular magnets 22A through 22H and the electromagnets 12 or 14. Accordingly, a turning force, shown by the arrow 32, acts upon the rotating disk-shaped surface 24. The rotating disk-shaped surface 24, having been imparted thereto turning force, continues to rotate due to inertial forces, even when it has been de-energized after the end point Eo has coincided with the center point Ro of the electromagnet 12 or 14. The larger the inertial force, the smoother the rotation.

Figure 6:
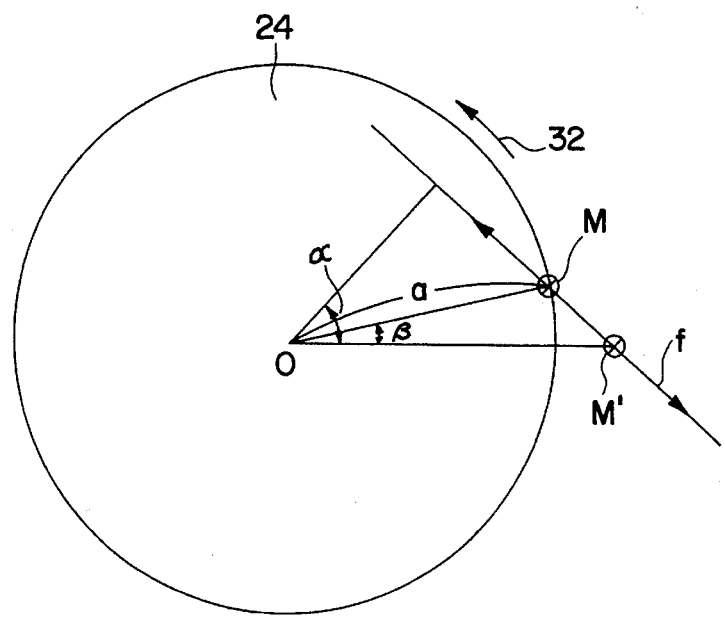

At the initial stage of the rotation, an angular moment, as that shown in FIG. 6, is imparted to the rotating disk-shaped surface 24. That is, at the start of the rotation, as shown in FIG. 6, when the pole M of a tabular magnet is slightly displaced in the rotational direction from the pole M' of an electromagnet, a repulsive force operates between both of the poles M and M' of the tabular magnet at the rotating side and the electromagnet at the stationary side, respectively. Therefore, from the relationship illustrated in FIG. 6, an angular torque T is generated based on the formula: $T=F.a.\cos(\alpha-\beta)$, where in a is a constant. The angular torque starts the rotation of the rotating disk-shaped surface 24. After the rotating disk-shaped surface 24 has started rotating, its rotating speed gradually increases due to an inertial moment thereof, which allows a large turning driving force to be produced. After a stable rotation of the rotating disk-shaped surface 24 has been produced, when a necessary electromotive force can be developed in an electromagnetic coil (not illustrated) by externally bringing it near a rotated body 10 to be rotated along with the rotating disk-shaped surface 24. This electric power can be used for other applications. This rotating principle is based on the rotating principle of the magnetic rotating apparatus already disclosed in Japanese Patent Publication No. 61868/1993 (U.S. Pat. No. 4,751,486) by the inventor. That is, even if an electromagnet, provided for one of the rotors of the magnetic rotating apparatus disclosed in the same Patent Application, is fixed, it is rotated in accordance with the rotating principle disclosed therein. For details, refer to the above Japanese Patent Publication No. 61868/1993 (U.S. Pat. No. 4,751,486).

The number of tabular magnets 22A through 22H is not limited to "8" as shown in FIGS. 1 and 3. Any number of magnets may be used. In the above-described embodiment, although the tabular magnets 22A through 22H are disposed along half of the peripheral area of the disk-shaped surface 24, and the balancers 20A through 20H are disposed along the other half of the peripheral area, the tabular magnets may further be disposed along other areas of the disk-shaped surface 24. It is preferable that balancers, in addition to magnets, are provided along a portion of the peripheral area on the disk-shaped surface. The counter weights, which do not need to be formed into separate blocks, may be formed into one sheet of plate which extends on the outer peripheral area of the disk-shaped surface. In addition, in the above-described embodiments, while the construction is such as to allow the electromagnets to be energized for a predetermined period of time for every rotation of the rotating disk-shaped surface, the circuit may be so constructed as to allow, upon increased number of rotations, energization of the electromagnets for every rotation of the rotating disk-shaped surface, starting from its second rotation onwards. Further, in the above-described embodiment, a tabular magnet has been used for the permanent magnet, but other types of permanent magnets may also be used. In effect, any type of magnet may be used as the permanent magnet means as long as a plurality of magnetic poles of one type is disposed along the outer surface of the inner periphery and a plurality of magnetic poles of the other type are disposed along the inner peripheral surface of the disk-shaped surface, so that a pair of corresponding magnetic poles of one and the other polarities is obliquely arranged, with respect to the radial line 11, as shown in FIG. 3.

Although the tabular magnets 22A through 22H are mounted on the magnet rotors 6 and 8 in the above embodiment, they may be electromagnets. In this case, the electromagnets 12 and 14 may be the alternative of electromagnets or permanent magnets.

According to the magnetic rotating apparatus of the present invention, rotational energy can be efficiently obtained from permanent magnets. This is made possible by minimizing as much as possible current supplied to the electromagnets, so that only a required amount of electrical energy is supplied to the electromagnets.

It should be understood that many modifications and adaptations of the invention will become apparent to those skilled in the art and it is intended to encompass such obvious modifications and changes in the scope of the claims appended hereto.

What is claimed is:

1. A magnetic rotating apparatus comprising a rotating shaft; a rotor which is fixed to said rotating shaft and which has disposed thereon a plurality of permanent magnets and balancers for balancing rotation, the permanent magnets being disposed such that one magnetic polarity type is arranged along an outer peripheral surface in the direction of rotation and the other magnetic polarity type arranged along an inner peripheral surface, with each pair of corresponding magnetic poles of one and the other polarities obliquely arranged with respect to a radial line; an electromagnet, which is disposed facing this rotor, for developing a magnetic field which produces the other magnetic polarity type on the facing surface and energizing means for intermittently energizing said electromagnet means from where the leading permanent magnet, based on the rotation of said rotor, passes the facing surface of the electromagnet in the direction of rotation.

2. A magnetic rotating apparatus as claimed in claim 1, wherein said rotor and electromagnet means are one of a plurality of pairs of rotors and electromagnet means, each disposed facing each, wherein each rotor is fixed to said rotating shaft.

3. A magnetic rotating apparatus as claimed in claim 1, wherein said permanent magnet means are tabular magnets.

4. A magnetic rotating apparatus as claimed in claim 1, wherein said balancers are made of non-magnetic substances.

5. A magnetic rotating apparatus as claimed in claim 1, wherein said energizing means comprises a relay with a solenoid and a contact, and a DC power source.

6. A magnetic rotating apparatus as claimed in claim 5, wherein said DC power source is electrically connected to a charger.

7. A magnetic rotating apparatus as claimed in claim 1, wherein said permanent magnet means are substituted to electromagnets and said electromagnet means is substituted to a permanent magnet means.

8. A magnetic rotating apparatus comprising:

a rotating shaft;

a first rotor which is fixed to said rotating shaft and which has disposed thereon permanent magnet means and means for balancing rotation, the permanent magnet means being disposed such that a plurality of magnetic poles of the second polarity type is arranged along an outer peripheral surface in the direction of rotation, and a plurality of magnetic poles of first polarity arranged along an inner peripheral surface, with each pair of corresponding magnetic poles of the one and the other polarities obliquely arranged with respect to a radial line;

a second rotor which rotates along with the first rotor and is fixed to said rotating shaft, having disposed thereon a plurality of permanent magnets and balancers for balancing rotation, the permanent magnets being disposed such that one magnetic polarity type is arranged along an outer peripheral surface in the direction of rotation and the other magnetic polarity type arranged along an inner peripheral surface, with each pair of corresponding magnetic poles of one and the other polarities obliquely arranged with respect to a radial line;

a first and a second electromagnet means, which are magnetically connected and disposed facing the first and second rotors, respectively, for developing a magnetic field which faces the magnetic field produced by said first and second rotors; and detecting means for detecting rotating position of said rotors to allow said electromagnet means to be energized.

9. A magnetic rotating apparatus as claimed in claim 8, wherein said electromagnet means is energized in synchronism with rotations of the rotor.

10. A magnet rotating apparatus as claimed in claim 8, wherein said permanent magnet means are tabular magnets and said means for balancing rotation are made of non-magnetic substances.

11. A magnetic rotating apparatus as claimed in claim 8, wherein said permanent magnet means are substituted to electromagnets and said first and second electromagnet means are substituted to permanent magnet means, respectively.

12. A magnetic rotating apparatus comprising:

a rotating shaft;

a rotor which is fixed to said rotating shaft and which has disposed thereon permanent magnet means and means for balancing rotation, the permanent magnet means being disposed such that a plurality of magnetic poles of one polarity type is arranged along an outer peripheral surface in the direction of rotation, and a plurality of magnetic poles of the other polarity type arranged along an inner peripheral surface, with each pair of corresponding magnetic poles of one and the other polarities obliquely arranged with respect to a radial line;

electromagnet means, which is disposed facing the rotor, for developing a magnetic field which faces a magnetic field of said rotor;

wherein said rotor and electromagnet means are one of a plurality of pairs of rotors and electromagnet means, each disposed facing each, wherein each rotor is fixed to said rotating shaft; and detecting means for detecting rotating position of said rotor to allow said electromagnet means to be energized.

* * * * *